US010072625B2

(12) United States Patent
Hesketh et al.

(10) Patent No.: US 10,072,625 B2
(45) Date of Patent: Sep. 11, 2018

(54) METHOD OF CONTROLLING AN ENGINE OF A MOTOR VEHICLE

(71) Applicant: Ford Global Technologies, LLC, Dearborn, MI (US)

(72) Inventors: David Hesketh, Ingatestone (GB); Themi Philemon Petridis, Bishop's Stortford Herts (GB); Ian Halleron, Chelmsford (GB); Christopher Edward Pedlar, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/607,996

(22) Filed: May 30, 2017

(65) Prior Publication Data
US 2017/0260954 A1 Sep. 14, 2017

Related U.S. Application Data

(62) Division of application No. 14/230,280, filed on Mar. 31, 2014, now abandoned.

(30) Foreign Application Priority Data

Apr. 10, 2013 (GB) .................................. 1306504.0

(51) Int. Cl.
*F02N 11/08* (2006.01)
*B60W 20/10* (2016.01)
*G05B 13/02* (2006.01)

(52) U.S. Cl.
CPC ......... *F02N 11/0818* (2013.01); *B60W 20/10* (2013.01); *G05B 13/02* (2013.01)

(58) Field of Classification Search
CPC .. F02D 2200/604; F02D 41/06; F02D 41/062; F02D 41/065; F02N 11/08;
(Continued)

(56) References Cited

U.S. PATENT DOCUMENTS

| 7,003,395 | B1 | 2/2006 | Thompson et al. |
| 7,036,477 | B1 | 5/2006 | Thompson et al. |

(Continued)

FOREIGN PATENT DOCUMENTS

| CN | 1840881 A | 10/2006 |
| CN | 104100387 A | 10/2014 |
| FR | 2937091 A1 | 4/2010 |

OTHER PUBLICATIONS

1st Office Action in Corresponding Chinese Patent Application Serial No. 201410134316.X, dated Jul. 5, 2017, 11 pages.
(Continued)

*Primary Examiner* — Stephen K Cronin
*Assistant Examiner* — Anthony L Bacon
(74) *Attorney, Agent, or Firm* — Alice Xu; Brooks Kushman P.C.

(57) ABSTRACT

A vehicle start-stop system includes an engine and a controller. The controller is programmed to operate the system in a first mode when a first input is selected, and in a second mode when a second input is selected. The controller is further programmed to inhibit engine stop in response to being in the first mode and an evaporator temperature having a first value, and stop the engine in response to being in the second mode and the evaporator temperature having the first value.

6 Claims, 4 Drawing Sheets

(58) Field of Classification Search
CPC ............. F02N 11/0803; F02N 11/0814; F02N 11/0818; F02N 11/0822; F02N 11/0829; F02N 11/084; F02N 2200/0804; F02N 2200/0806; F02N 2200/0811
See application file for complete search history.

(56) References Cited

U.S. PATENT DOCUMENTS

| | | | |
|---|---|---|---|
| 7,490,000 B2 | 2/2009 | Siddiqui et al. | |
| 7,698,053 B2 | 4/2010 | Mori | |
| 2002/0148424 A1 | 10/2002 | Wakabayashi et al. | |
| 2003/0230093 A1* | 12/2003 | Iwanami | B60H 1/3222 62/133 |
| 2004/0144107 A1 | 7/2004 | Breton et al. | |
| 2004/0211381 A1* | 10/2004 | Ogawa | B60H 1/04 123/179.4 |
| 2005/0143901 A1 | 6/2005 | Scholt et al. | |
| 2006/0137643 A1 | 6/2006 | Thompson et al. | |
| 2007/0107455 A1 | 5/2007 | Deiml et al. | |
| 2012/0215430 A1* | 8/2012 | Watanabe | B60H 1/00778 701/113 |
| 2012/0259530 A1* | 10/2012 | Wakou | F02N 11/084 701/102 |
| 2013/0245925 A1* | 9/2013 | Malone | F02N 11/0818 701/113 |
| 2014/0088853 A1 | 3/2014 | Christen et al. | |
| 2014/0088854 A1 | 3/2014 | Smague | |
| 2014/0309910 A1 | 10/2014 | Hesketh et al. | |
| 2015/0361939 A1* | 12/2015 | Iwasaki | B60H 1/00764 701/112 |

OTHER PUBLICATIONS

Examination Report under section 18(3) in corresponding International Patent Application No. GB1306504.0, dated Oct. 5, 2017, 4 pages.

* cited by examiner

| Example affected subsystems (A) | Minimum-stop/Max comfort (B) | Maximum-stop/Minimum comfort (C) |
|---|---|---|
| Stop behaviour as a function of climate control system | • Only stop if tightly defined comfort criteria are met (cabin temperature, evaporator temperature, humidity etc.)<br>• Start if tightly defined comfort criteria are not met (cabin temperature, evaporator temperature, humidity etc.) | • Stop regardless of cabin comfort conditions.<br>• Only start based on driver intention to drive away, i.e. ignore any deviation from desired cabin comfort. |
| Stop behaviour as a function of primary driver controls | • Only stop when transmission in neutral and clutch pedal fully released (SIN stop)<br>• Start when clutch pressed (SIN start) | • Stop in gear as well as in neutral (SIG stops) – many possible variants exist.<br>• Start in gear (SIG starts) – many possible variants exist. |
| Clutch pedal state determination. The pedal thresholds used to initiate stops and restarts can be varied to make stops more or less likely for a given driving style | • Only stop if the pedal is fully released, indicating the driver really intends to stop for extended periods<br>• Restart when the clutch is slightly pressed | • Stop when the pedal is still partially pressed.<br>• Restart when the pedal is partially pressed. |
| Brake pedal state determination (on automatic transmission applications) | • Only stop if the brake pedal is pushed hard, indicating the driver really intends to stop for extended periods, and preventing stops in slow speed creeping traffic jams.<br>• Restart when the brake pedal is moved in the released direction. | • Stop when the pedal is only pressed lightly, maximising the stop opportunities<br>• Restart only when the brake pedal is fully released. |
| Steering system power assist | • Normal or slightly reduced steering assist continues during a stop event<br>• Start if steering request is made | • Steering assist completely removed during a stop event<br>• Only start based on driver intention to drive away, i.e. ignore steering requests. |
| Stop behaviour as a function of vehicle speed | • Only stop when the vehicle is stationary<br>• Restart if vehicle speed is non-zero | • Stop at high vehicle speed (Rolling stop/start)<br>• Restart based on driver torque demand |
| Stop behaviour as a function of vehicle manoeuvring | • Do not stop in reverse, or following a forward reverse sequence, or whenever the rear view camera is active<br>• Restart if reverse is selected. | • Stop even in reverse.<br>• Stop even if rear view camera active.<br>• Do not restart based on reverse gear having been selected. |

Fig.2a

| Example affected subsystems (A) | Minimum-stop/ Max comfort (B) | Maximum-stop/Minimum comfort (C) |
|---|---|---|
| Terrain mode vehicle management system | • Only stop if in normal road mode<br>• Restart if non-normal road mode is selected | • Stop in all road modes, including off-road<br>• Only start based on driver intention to drive away, i.e. ignore driver mode selection. |
| Stop behaviour as a function of driver presence estimation | • Do not stop engine if driver's door open or seat belt undone<br>• Restart engine and do not allow further stops if driver's door open or seat belt undone | • Stop/restart independent of door and seatbelt status |
| Stop behaviour as a function of vehicle attitude | • Do not stop on hills or where the parking brake or hill start assist functions are active<br>• Restart if parking brake or hill start assist is activated | • Stop and start regardless of gradients or parking brake activation. |
| Stop behaviour as a function of keyless entry system | • Do not stop if the key leaves the vehicle<br>• Restart if the key leaves the vehicle | • Stop and start regardless of key presence |
| Stop behaviour as a function of electrical system status | • Do not stop if the battery is less than fully charged<br>• Restart if the battery state of charge reduces to a level that is reasonably close to fully charged. | • Stop providing the battery contains enough charge to restart the engine.<br>• Only restart the engine if the battery state of charge has reached the minimum level to restart the engine |
| Human machine interface | • Do not report stop/start system status to driver in the cluster | • Make stop/start and fuel economy information more prominent in displays |

Fig.2b

METHOD OF CONTROLLING AN ENGINE OF A MOTOR VEHICLE

CROSS-REFERENCE TO RELATED APPLICATIONS

This application is a division of U.S. application Ser. No. 14/230,280 filed Mar. 31, 2014, which, in turn, claims foreign priority benefits under 35 U.S.C. § 119(a)-(d) to GB 1306504.0 filed Apr. 10, 2013, the disclosures of which are hereby incorporated by reference in their entirety.

TECHNICAL FIELD

This invention relates to motor vehicles and in particular to a method and apparatus for controlling the operation of an engine of a stop-start enabled motor vehicle.

BACKGROUND

It is well known to provide a motor vehicle with apparatus often referred to as a stop-start system to automatically stop and start the engine when a number of predefined conditions are found to be present.

Such stop-start systems reduce fuel consumption and emissions by stopping the engine when it would otherwise by unnecessarily idling.

Typically, a number of other components or systems such as, for example and without limitation, a climate control system, an instrument cluster, a brake system and an electric power supply system have a modified operation to provide an appropriate behavior during the various engine operating states.

For example, the loss of engine idling when the engine has been automatically stopped means that power is unavailable for typical engine driven ancillaries e.g. the alternator, vacuum pump, water pump and air conditioning compressor. This lack of power often leads to reduced performance of the associated systems and this loss in performance may be noticeable by an occupant of the motor vehicle.

The most noticeable loss is that associated with the climate control system. To maintain cabin comfort in winter, a source of heat energy must be transferred from the engine to the cabin heater matrix and to maintain cabin comfort in summer, a source of cold refrigerant must be supplied to the evaporator or heat exchanger in the cabin.

As neither is normally possible with the engine stopped, the climate control system often automatically operates in an attempt to maximize the time that acceptable cabin comfort can be maintained by taking mitigating actions such as changing the position of air control flaps and reducing the blower speed. Ultimately, the climate system may request that the engine be automatically restarted to maintain cabin comfort for a longer period, or request that further engine stops be prevented until a range of parameters within the climate system is met. Such parameters may include, in winter, ensuring the engine coolant is sufficiently warm to provide heat to the cabin and, in summer, ensuring that the evaporator is sufficiently cold to prevent the formation of damp or musty smells in the cabin.

In order to maximize stop availability whilst minimizing the impact on cabin climate comfort, an inevitable trade-off must therefore be made by the system designers and this trade-off is likely to be sub-optimal for many vehicle occupants, leading to dissatisfaction with vehicle performance.

It is further known to provide a stop-start enabled motor vehicle with a driver selectable switch, which can be used to de-activate the stop-start system.

However, although such a switch enables a driver to manually deactivate the automatic stop start behavior of the motor vehicle this will result in an unacceptable increase in both fuel consumption and engine emissions.

SUMMARY

It is an object of the invention to provide a method of controlling an engine of a stop-start enabled motor vehicle that enables a user of the motor vehicle to adjust the stop-start behavior of the motor vehicle to better suit the current operating conditions of the motor vehicle.

According to a first aspect of the invention there is provided a method of controlling an engine of a stop-start enabled motor vehicle, the engine having at least first and second stop-start modes of operation in each of which stopping of the engine is effected when respective stop conditions are met and starting of the engine is effected when respective start conditions are met and a user input device to select the stop-start mode of operation to be used wherein the method comprises providing a first set of engine stop conditions for use when the first stop-start mode of operation is selected that is more restrictive than a second set of engine stop conditions for use when the second stop-start mode of operation is selected and further comprises a first set of engine start conditions for use when the first stop-start mode of operation is selected that are less restrictive that a second set of engine start conditions for use when the second stop-start mode of operation is selected.

This has the advantage that the opportunities to stop the engine are increased when the second set of stop conditions are used compared to the first set of stop conditions and the opportunities to start the engine are increased when the first set of start conditions are used compared to the second set of start conditions.

There may be at least one further engine stop-start mode of operation and a corresponding set of stop conditions and the further stop conditions may be less restrictive than the first set of stop conditions and may be more restrictive than the second set of stop conditions.

There may be at least one further engine stop-start mode of operation and a corresponding set of start conditions and the start conditions may be more restrictive than the first set of start conditions and less restrictive than the second set of start conditions.

The first set of stop and start conditions may increase the opportunities to start the engine and may reduce the opportunities to stop the engine so as to bias control of the engine towards driver comfort.

The second set of stop and start conditions may maximize the opportunities to stop the engine and may minimize the opportunities to start the engine so as to bias control of the engine towards fuel economy.

According to a second aspect of the invention there is provided a system for controlling the operation of an engine of a stop-start enabled motor vehicle, the engine having at least first and second engine stop-start modes of operation in each which stopping of the engine is effected when respective stop conditions are met and starting of the engine is effected when respective start conditions are met, the system comprising a stop-start controller arranged to receive information regarding the operating state of the motor vehicle, information regarding operation of one or more vehicle controls by an operator of the motor vehicle and information from a human machine interface of which engine stop-start mode of operation is selected for use, wherein the stop-start controller is operable to use a first set of engine stop conditions when the first engine stop-start mode of operation is selected and use a second set of engine stop conditions when the second engine stop-start mode of operation is selected, the first set of stop conditions being more restrictive than the second set of stop conditions and is operable to use a first set of engine start conditions when the first engine stop-start mode of operation is selected and use a second set of engine start conditions when the second engine stop-start mode of operation is selected, the first set of start conditions being less restrictive than the second set of start conditions.

This has the advantage that the opportunities to stop the engine are increased when the second set of stop conditions are used compared to the first set of stop conditions thereby increasing fuel economy and the opportunities to start the engine are increased when the first set of start conditions are used compared to the second set of start conditions thereby increasing driver comfort.

There may be at least one further engine stop-start mode of operation and a corresponding set of stop conditions and the further stop conditions may be less restrictive than the first set of stop conditions and may be more restrictive than the second set of stop conditions.

There may be at least one further engine stop-start mode of operation and a corresponding set of start conditions and the further start conditions may be more restrictive than the first set of start conditions and may be less restrictive than the second set of start conditions.

The first set of stop and start conditions may increase the opportunities to start the engine and may reduce the opportunities to stop the engine so as to bias control of the engine towards driver comfort.

The second set of stop and start conditions may maximize the opportunities to stop the engine and may minimize the opportunities to start the engine so as to bias control of the engine towards fuel economy.

The invention will now be described by way of example with reference to the accompanying drawing of which:

BRIEF DESCRIPTION OF THE DRAWINGS

FIGS. 2a and 2b are a table indicating various engine stop conditions used in a method and stop-start system according to first and second aspects of the invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
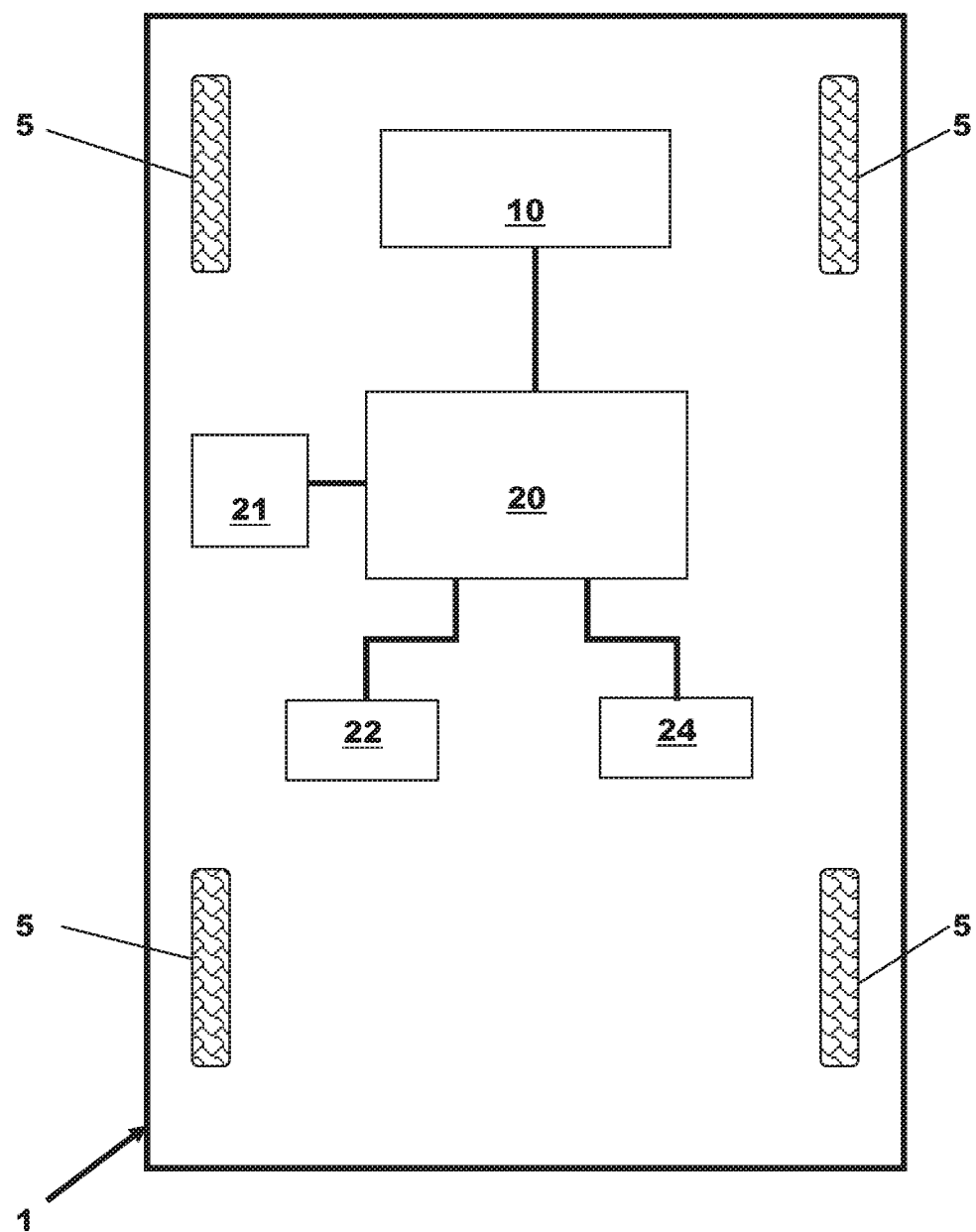
FIG. 1 is a schematic plan view of a motor vehicle according to a third aspect of the invention having a stop-start system according to a second aspect of the invention.

With particular reference to FIG. 1 there is shown a motor vehicle 1 having in this case four road wheels 5.

An engine 10 is arranged to drive at least two of the road wheels 5 via a driveline (not shown).

Operation of the engine 10 is controlled by a stop-start system comprising a stop-start controller 20, a human machine interface 21, a number of vehicle operational inputs 22 and a number of driver inputs 24.

The human machine interface (HMI) 21 can be in the form of a switch having a number of operational positions or be a touch screen device in which a user can input demands/selections and in some cases via which messages can be output to the user.

The vehicle operational inputs 22 may include one or more of, for example and without limitation, the current speed of the motor vehicle 1, the temperature of engine coolant, the rotational speed of the engine, ambient temperature, cabin temperature, climate control evaporator temperature and vehicle occupancy.

The driver inputs 24 will depend upon whether the motor vehicle 1 has an automatic or manual transmission but may include two or more of, for example and without limitation, accelerator pedal position, clutch pedal position, brake pedal position, brake pedal load, transmission engagement state (engaged/neutral) and parking brake (handbrake) state.

As is well known in the art, the vehicle operational inputs 22 and the driver inputs 24 are used in combination by the stop-start controller 20 to determine when it is possible/safe to stop and start the engine 10 and there are many possible strategies currently in use. These include but are not limited to stop in gear, stop in neutral and free rolling (engine stopped while the vehicle is moving).

In the case of the stop-start system shown in FIG. 1 the HMI 21 is used to vary the operation of the stop-start system and includes at least three instructional outputs or selections.

If the HMI 21 is in the form of a switch these outputs will correspond to a first switch position in which the stop-start conditions used to decide whether to stop and start the engine 10 are optimized to provide the best possible comfort for a user of the motor vehicle 1, a second switch position in which the stop-start conditions used to decide whether to stop and start the engine 10 are optimized to provide the best possible economy and a third switch position in which stop-start operation of the engine is disabled.

A similar arrangement may be provided if the HMI 21 is a touch screen device with the user being provided with three options corresponding to the first, second and third switch positions referred to above. However, in the case of an HMI 21 in the form of a touch screen device many more options can be provide so that a user such as a driver of the motor vehicle 1 can customize the operation of the stop-start system to meet their particular preferences. For example, economy can be optimized while retaining a user selectable level of climate control or of steering assistance so that the stop-start conditions lie somewhere between those optimized for comfort and economy.

Although more than three switch positions can be provided in the case of the use of a switch, it will be appreciated that the range of options available to a user can be far greater if a touch screen HMI device 21 is used.

In operation the stop-start controller 20 of the stop-start system analyses the vehicle and driver information 22 and 24 it receives and compares these to sets of conditions that need to be met to stop or start the engine 10 for the current driver demand/selection as input via the HMI 21.

For example, if the driver selects the engine be run continuously then no stop-start conditions have to be set because, irrespective of the various vehicle and driver inputs 22 and 24 received by the stop-start controller 20, the engine 10 is continuously run while motor vehicle 1 is in a 'Key-On' state.

Similarly, if the driver selects comfort to be maximized, the stop-start conditions are set to ensure that cabin temperature, for example, is not compromised by stopping of the engine 10 even if this results in a reduction in the fuel economy of the motor vehicle 1. This normally results in the opportunities for stopping the engine 10 being reduced compared to a conventional stop-start system.

If the driver selects economy to be maximized, the stop-start conditions are set to ensure that whenever possible the engine 10 is stopped even if this results in a reduction in comfort for the driver. This setting may, for example, be used by a driver if the ambient temperature is not too hot or too cold because in such a situation neither heating nor cooling of the cabin may be essential. Also, if the ambient humidity is low a driver may select the economy setting because it is easier to tolerate even a relatively high cabin temperature if there is low humidity. The use of the economy setting will normally result in the opportunities for stopping the engine 10 being increased compared to a conventional stop-start system.

Therefore a first set of engine stop conditions are provided for use when the first or comfort stop-start mode of operation is selected and a second set of engine stop conditions are provided for use when the second stop-start mode of operation is selected. It will be appreciated that the first set of conditions will reduce the opportunities to stop the engine compared to the second set of conditions.

Examples of various control options for these comfort and economy stop settings are shown in the table included as FIGS. 2a and 2b and will be described in more detail hereinafter.

Although the invention has been described with respect to a stop-start enabled motor vehicle in the form of a 'microhybrid' having only an internal combustion engine as a source of motive power it will be appreciated by those skilled in the art that it could also be applied with advantage to a stop-start enabled motor vehicle in the form of a 'mild or full-hybrid' motor vehicle having an internal combustion engine and one or more electric motors as sources of motive power.

In the case of a 'mild or full-hybrid' motor vehicle the automatic stopping and starting is not only controlled by the actions of the driver but also without driver intervention to maximize full economy and reduce fuel consumption by using the electric motor or motors to drive the motor vehicle when the operational conditions permit. In such a case, the HMI 21 can be used by a user or driver of the motor vehicle 1 to customize the circumstances in which electric power is utilized by reducing the opportunities for use of electric power when the comfort setting is selected and increasing the opportunities for use of electric power when economy mode is chosen. It will however be appreciated that such changes will be restricted by the physical capability of the electrical drive to provide power, the electrical storage capacity of the electric system of the motor vehicle and the requirement to use electric power to reduce fuel consumption and emissions.

Figure 3:
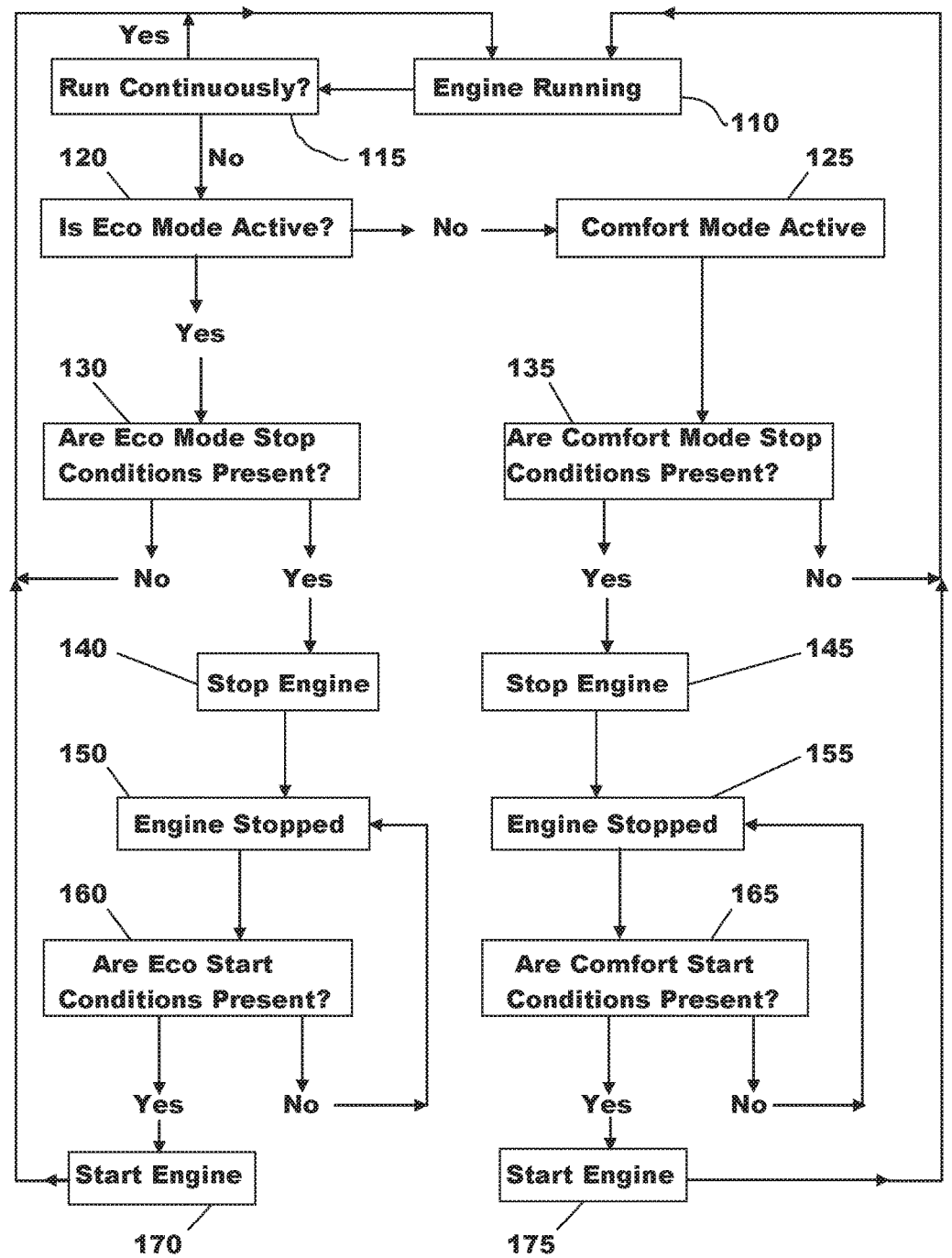
FIG. 3 is a high level flow chart showing one embodiment of a method according to the first aspect of the invention.

Referring now to FIG. 3 there is shown a high level flow chart of a method of controlling an engine of a stop-start enabled motor vehicle such as the engine 10 shown in FIG. 1.

The method shown starts at box 110 where the engine 10 is running but it will be appreciated that prior to this step there will be the steps of 'Key-On' and a manual starting of the engine 10.

From box 110 the method advances to box 115 where it is checked whether the driver has selected using the HMI 21 to deactivate stop-start running so that the engine 10 is run continuously while a 'Key-On' state persists. It will be appreciated that in some cases such as when the engine 10 is cold stop-start operation is not possible and so box 115 could also check to see whether stop-start operation is possible.

If continuous running is to be used, the method returns to box 110 and the engine remains running. However, if continuous running is not to be used then the method advances to box 120 where it is checked whether the economy mode has been selected and, if it has, the method advances to box 130 and, if it has not, the method advances to box 125. It will be appreciated that alternative logic could be used to obtain the same effect.

For example and without limitation, the method could advance from box 110 to box 125 and then check whether the comfort mode is active and, if it is not, proceed to box 120 but otherwise continue to box 135. Alternatively, a single test could be used to replace boxes 115, 120 and 125 such as "Is driver requested selection, 'continuous', 'economy' or 'comfort'" "If 'continuous' go to 110, if 'economy' go to 130 and if 'comfort' go to 135".

Assuming the economy mode is active, then the method advances from box 120 to box 130 it is checked whether economy optimized stop conditions are present. That is to say, if the economy mode has been selected, a predefined number of economy biased stop conditions are set for use in determining whether to stop the engine 10.

If, when checked in box 130, the economy stop conditions are not present, the method returns to box 110 with the engine 10 still running. However, if when checked in box 130 the economy stop conditions are present, the method advances to box 140 and the necessary actions to stop the engine 10 are taken. The method then advances to box 150 where the engine 10 is stationary in a stopped state.

It is then checked in box 160 whether start conditions are present and preferably whether economy optimized start conditions are present. That is to say, if the economy mode has been selected, a predefined number of economy biased start conditions are set for use in determining whether to start the engine 10.

If, when checked in box 160, the economy start conditions are not present, the method returns to box 150 with the engine 10 still stopped. However, if when checked in box 160 the economy start conditions are present, the method advances to box 170 and the necessary actions to start the engine 10 are taken. The method then returns to box 110 with the engine 10 running.

Returning now to box 125, where it has been determined that the comfort mode has been selected, the method advances from box 125 box 135. A further option (not shown) could be provided to allow for system errors by making the box 125 a test for whether the comfort mode has been selected and, if it has not been selected, returning to box 110 and, if it has been selected, continuing to box 135 as shown on FIG. 3.

Assuming the comfort mode is active then in box 135 it is checked whether comfort optimized stop conditions are present. That is to say, if the comfort mode has been selected, a predefined number of comfort biased stop conditions are set for use in determining whether to stop the engine 10.

If, when checked in box 135, the comfort stop conditions are not present the method returns to box 110 with the engine 10 still running. However, if when checked in box 135 the comfort stop conditions are present, the method advances to box 145 and the necessary actions to stop the engine 10 are taken. The method then advances to box 155 where the engine 10 is stationary in a stopped state.

It is then checked in box 165 whether start conditions and preferably comfort optimized start conditions are present. That is to say, if the comfort mode has been selected, a predefined number of comfort biased start conditions are set for use in determining whether to start the engine 10.

If, when checked in box 165, the comfort start conditions are not present the method returns to box 155 with the engine 10 still stopped. However, if when checked in box 165 the comfort start conditions are present, the method advances to box 175 and the necessary actions to start the engine 10 are taken. The method then returns to box 110 with the engine 10 running.

It will be appreciated that various features of the method have been omitted from FIG. 3. For example, if at any time a vehicle 'Key-Off' event occurs then the method will end. In addition, if the driver changes the required operation selection at any time then operation of the engines will immediately be changed to reflect the change in driver selection.

FIGS. 2a and 2b show a table providing examples of some possible stop conditions (as checked in boxes 130 and 135 on FIG. 3) for the economy and comfort modes. FIGS. 2a and 2b also show corresponding start conditions (as checked in boxes 160 and 165 on FIG. 3).

Referring now to FIGS. 2a and 2b the differences in the stop conditions between the comfort setting and the economy setting are shown in more detail.

In column 'A' the affected subsystem or action is given and in columns 'B' and 'C' different stop and start conditions are shown.

The conditions shown in column 'B' are various examples of a first set of stop and start conditions used when a comfort selection has been made by the driver. That is to say, control of the engine 10 is biased towards driver comfort and not economy when this driver selection is made. These conditions restrict stopping of the engine 10 and encourage starting of the engine 10.

The conditions shown in column 'C' are various examples of a second set of stop and start conditions used when an economy selection has been made by the driver. That is to say, control of the engine 10 is biased towards economy and not driver comfort when this driver selection is made. These conditions encourage stopping of the engine 10 and restrict starting of the engine 10.

Therefore the first set of stop conditions are more restrictive than the second set of stop conditions and the second set of start conditions are more restrictive than the first set of start conditions.

In the first example shown in FIG. 2a, the affected system is the climate control system and in column 'B', which are the comfort conditions, the engine 10 is only stopped if tightly defined climate comfort criteria such as, for example, cabin temperature, evaporator temperature or humidity are met. The engine 10 is started if tightly defined climate comfort criteria such as those referred to above are not met. In column 'C' corresponding economy mode conditions are to stop the engine 10 irrespective of cabin comfort conditions and to start the engine 10 based only on driver intention to drive away and ignore any cabin comfort conditions.

In the second example given in FIG. 2a, the affected system is driver controls and in column which are the comfort conditions, the engine 10 is only stopped when the transmission is in neutral and the clutch pedal is fully released. That is to say, the engine stop is a Stop in Neutral (SIN) stop. The engine 10 is started when the clutch is pressed. That is to say, the engine start is a Start in neutral (SIN) start. In column 'C' corresponding economy mode conditions are to permit stop in gear (SIG) engine stops as well as SIN engine stops and to permit SIG and SIN engine starts.

In the third example given in Table 2a, the affected system is a clutch pedal state determination. Clutch pedal position is normally used in the case of a manual transmission motor vehicle as a key factor in deciding whether to stop the engine. To achieve this clutch pedal position is normally sensed using a clutch pedal sensor or one or more switches associated with the clutch pedal and the state of engagement of a drive clutch between the engine 10 and a transmission (not shown) of the motor vehicle 1 is inferred based upon the sensed clutch pedal position. In such a system three ranges of clutch pedal movement are often defined, released, pressed and depressed.

In the released range it is assumed that the clutch pedal is not being touched, in the pressed range the clutch pedal has been moved beyond the released range and in the depressed range the clutch pedal has been moved beyond the pressed range. Expressed in percentages a released range may be in the order of 0% to 30% travel in the depressed direction, the pressed range may be in the order of 8% to 80% travel in the depressed direction and the depressed range may be in the order of 65 to 100% of travel in the depressed direction.

In column 'B' the comfort conditions are "Only stop the engine if the clutch pedal is fully released". This condition indicates that the driver intends to stop for an extended period of time and hence to maximize the comfort of the driver, those stops which could be result in a short duration stop are prevented by detecting that the driver is resting their foot on the clutch pedal and restart the engine 10 when the clutch pedal is slightly pressed.

In column 'C' the economy conditions are "Allow an engine stop even if the clutch pedal is still partially pressed", even though this condition indicates that the driver may not intend to stop for an extended period of time. Such a condition maximizes the stop opportunities and fuel can be saved and restart the engine 10 when the clutch pedal is partially pressed.

In the fourth example shown in FIG. 2a, the affected system is a brake pedal state determination for use on automatic transmission applications. Brake pedal position or applied load is normally used in the case of an automatic transmission motor vehicle as a key factor in deciding whether to stop the engine. In the case of brake pedal position this can be sensed using a sensor associated with the brake pedal and in the case of brake pedal applied load this can be sensed via a load sensor on the brake pedal or by sensing the pressure of hydraulic fluid in an associated braking system.

In column 'B' the stop condition for driver comfort is "Only stop the engine if the brake pedal is pushed hard". This condition would in practice be a test such as "Is the applied load greater than a high threshold value". The application of a high load implies that the driver intends to stop for an extended period of time. Since the comfort of the driver is likely to be adversely affected by frequent short engine stops and starts, stops are only permitted when the brake pedal is pushed hard. The start condition for driver comfort is to start the engine 10 when the brake pedal is moved in a released direction.

In column 'C' the stop economy condition is "Allow stop even if the brake pedal is only lightly pressed". This condition would in practice be a test such as "Is the applied load greater than a lower threshold value but less than a higher threshold value". The application of a light load implies that the driver may not intend to stop for an extended period of time but such a stop condition maximizes the engine stop opportunities. The corresponding start condition is to start the engine 10 only when the brake pedal is fully released thereby maximizing engine shutdown time.

Numerous further stop and start conditions for the comfort and economy modes are given in FIGS. 2a and 2b but are not described in detail. It will be appreciated that these could be used either on their own or in combination with one or more of the other stop and start conditions. That is to say, a number of these stop and start conditions could be used in boxes 130, 135 and 160, 165 respectively shown in FIG. 3 depending upon the complexity of the motor vehicle and the sub-systems present.

It will also be appreciated that the method steps shown in FIG. 3 could be used by the stop-start controller 20 to decide when to stop and start the engine 10.

Therefore in summary, the invention provides a driver of a motor vehicle with the opportunity to directly influence a trade-off between conflicting attributes of 'comfort' and 'economy' beyond those offered by the use of a conventional stop/start deactivate button, without the driver having to consider each subsystem explicitly.

For example, one driver may wish to absolutely maximize the fuel economy of the vehicle, whilst accepting a larger degradation in cabin comfort. Another driver may accept the operation of the stop/start system, but only if it results in no discernible degradation in climate comfort.

To achieve this functionality the stop-start system of the motor vehicle includes a driver control which allows the driver to indicate a general attribute preference. This may be in the form of a multi-position switch in the instrument panel, or menu options within a human machine interface such as a cluster display. The driver can in some embodiments choose from a range of possible attribute balances such as, for example, "maximum economy", "balanced" (possibly as per current stop-start operation) and "maximum comfort").

The terms 'comfort' and 'user comfort' as meant herein include not only the climatic conditions within a passenger compartment of the motor vehicle but also indicating minimal intrusiveness of the system and ease of use. For example, increasing the assistance provided to a steering system would be an increase in 'user comfort' because less physical effort has to be provided by the driver and reducing the frequency of short stops is also to be considered a comfort because such short stops can be annoying to some drivers. The term 'Economy mode' or 'ECO mode' means a mode of operation where economy of the motor vehicle is given preference over comfort and so more opportunities for stopping the engine are provided and the conditions for restarting the engine are stricter so that the shutdown period lasts as long as possible without compromising vehicle operation. Therefore the comfort mode of operation could be considered to be a reduced stop/maximum comfort mode of operation and the ECO or economy mode of operation could be considered to be a maximum stop/maximum fuel economy mode of operation.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle start-stop system comprising:
an engine; and
a controller programmed to:
operate the system in a user-comfort mode when a first input is selected, and in an economy mode when a second input is selected,
inhibit engine stop in response to being in the user-comfort mode and an evaporator temperature having a first value,
stop the engine in response to being in the economy mode and the evaporator temperature having the first value,
restart the engine in response to being in the user-comfort mode and the evaporator temperature having a second value, and
inhibit restarting the engine in response to being in the economy mode and the evaporator temperature having the second value.

2. The start-stop system of claim 1, wherein the controller is further programmed to restart the engine in response to being in the economy mode and the evaporator temperature having a third value that is greater than the second value.

3. A vehicle start-stop system comprising:
an engine configured to automatically stop and start during travel; and
a start-stop system including a user interface having first and second inputs and a controller, the controller being programmed to:
operate the system in a user-comfort mode when the first input is selected, and in an economy mode when the second input is selected,
inhibit engine stop in response to being in the user-comfort mode and an evaporator temperature having a first value,
stop the engine in response to being in the economy mode and the evaporator temperature having the first value
restart the engine in response to being in the user-comfort mode and the evaporator temperature having a second value, and
inhibit restarting the engine in response to being in the economy mode and the evaporator temperature having the second value.

4. The start-stop system of claim 3, wherein the controller is further programmed to restart the engine in response to being in the economy mode and the evaporator temperature having a third value that is greater than the second value.

5. A method of operating a start-stop system of a vehicle, the method comprising:
operating the system in a user-comfort mode when a first input is selected, and in an economy mode when a second input is selected;
inhibiting an engine stop in response to being in the user-comfort mode and an evaporator temperature having a first value;
stopping the engine in response to being in the economy mode and the evaporator temperature having the first value restarting the engine in response to being in the user-comfort mode and the evaporator temperature having a second value; and inhibiting restarting the engine in response to being in the economy mode and the evaporator temperature having the second value.

6. The method of claim 5 further comprising: restarting the engine in response to being in the economy mode and the evaporator temperature having a third value that is greater than the second value.

\* \* \* \* \*